United States Patent
Wang et al.

(10) Patent No.: US 11,280,260 B2
(45) Date of Patent: Mar. 22, 2022

(54) ENGINE OPERATING METHOD AND ENGINE SYSTEM FOR IMPROVED LOAD STEP ACCEPTANCE

(71) Applicant: Caterpillar Inc., Peoria, IL (US)

(72) Inventors: Paul Sai Keat Wang, Peoria, IL (US); Jaswinder Singh, Dunlap, IL (US); David Ginter, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 100 days.

(21) Appl. No.: 16/912,285

(22) Filed: Jun. 25, 2020

(65) Prior Publication Data
US 2021/0404375 A1    Dec. 30, 2021

(51) Int. Cl.
| | | |
|---|---|---|
| F02B 37/20 | (2006.01) | |
| F02D 41/32 | (2006.01) | |
| F01N 13/10 | (2010.01) | |
| F02M 35/10 | (2006.01) | |
| F01P 5/10 | (2006.01) | |
| F02M 21/02 | (2006.01) | |
| F02D 41/00 | (2006.01) | |
| F01N 3/04 | (2006.01) | |
| F02B 37/02 | (2006.01) | |
| F01P 3/20 | (2006.01) | |

(52) U.S. Cl.
CPC ............ *F02B 37/20* (2013.01); *F01N 3/046* (2013.01); *F01N 13/102* (2013.01); *F01P 3/20* (2013.01); *F01P 5/10* (2013.01); *F02B 37/02* (2013.01); *F02D 41/0027* (2013.01); *F02D 41/32* (2013.01); *F02M 21/0221* (2013.01); *F02M 21/0245* (2013.01); *F02M 21/0278* (2013.01); *F02M 35/10157* (2013.01); *F02M 35/10216* (2013.01); *F01P 2060/16* (2013.01)

(58) Field of Classification Search
CPC ...... F02B 37/02; F02B 37/20; F02D 41/0027; F02D 41/32; F02M 35/10157; F02M 35/10216; F02M 21/0221; F02M 21/0245; F02M 21/0278; F01P 3/20; F01P 5/10; F01P 2060/16; F01N 3/102
See application file for complete search history.

(56) References Cited

U.S. PATENT DOCUMENTS

| | | |
|---|---|---|
| 4,531,497 A | 7/1985 | Smith |
| 5,713,340 A | 2/1998 | Vandenberghe et al. |
| 8,534,065 B2 | 9/2013 | Pursifull et al. |
| 9,175,614 B2 | 11/2015 | Hoefer et al. |

(Continued)

*Primary Examiner* — Audrey B. Walter
*Assistant Examiner* — Dapinder Singh
(74) *Attorney, Agent, or Firm* — Brannon Sowers & Cracraft

(57) ABSTRACT

Operating an engine system includes feeding a flow of exhaust to a turbine in a turbocharger, receiving a load step request, and increasing a speed of rotation of the turbocharger based on an increase in a fueling rate initiated in response to the load step request. Operating the engine system further includes limiting dissipation of heat energy of the flow of exhaust to the turbine to hasten an increase in the speed of rotation of the turbocharger, and increasing dissipation of heat energy from the flow of exhaust after satisfaction of the load step request. Varying of the dissipation of heat energy can be achieved by displacing an insulating fluid in the exhaust manifold with a heat exchange fluid such as water and/or engine coolant.

20 Claims, 2 Drawing Sheets

(56) References Cited

U.S. PATENT DOCUMENTS

| | | |
|---|---|---|
| 9,856,803 B2 | 1/2018 | Howard et al. |
| 2005/0081834 A1* | 4/2005 | Perkins ............... F02B 29/0481 |
| | | 123/563 |
| 2007/0017223 A1* | 1/2007 | Wootton .................. H02P 9/02 |
| | | 60/645 |
| 2008/0098972 A1* | 5/2008 | Elwart ................... B60K 13/04 |
| | | 123/142.5 E |
| 2013/0160747 A1 | 6/2013 | Gibson et al. |

* cited by examiner

ENGINE OPERATING METHOD AND ENGINE SYSTEM FOR IMPROVED LOAD STEP ACCEPTANCE

TECHNICAL FIELD

The present disclosure relates generally to operating an engine system to accept a load step request, and more particularly to hastening an increase in a speed of rotation of a turbocharger during accepting the load step request.

BACKGROUND

Internal combustion engines are increasingly called upon to accommodate heightened demands with respect to emissions and efficiency. In the case of certain engine systems emissions and efficiency can be relatively tightly controlled where the engine is operated at a steady state condition with little or no change in engine speed or engine load. When changes in engine speed and load are required, such as to accept an increased output requirement of driven equipment, the engine can operate less efficiently or with increased amounts of certain emissions. Moreover, in many instances an engine will initially decrease its speed relatively sharply when an additional load is demanded, potentially leading to operating stability problems, undue delay in accepting the increased engine load, or requiring engine shut down altogether.

U.S. Pat. No. 9,856,803 to Howard et al. is directed to a natural gas engine system with improved transient response. In the strategy proposed by Howard et al., the natural gas engine system has a fuel source to supply natural gas for combustion and an air tank in fluid communication with the intake manifold and the exhaust manifold. A controller in the system is configured to direct a first amount of air from the air tank to the exhaust manifold and a second amount of air from the air tank to the intake manifold, apparently in transient response scenarios. While the system set forth in Howard et al. may work well there is always room for improvement and alternative strategies.

SUMMARY OF THE INVENTION

In one aspect, a method of operating an engine system includes feeding a flow of exhaust from combustion cylinders in an engine to a turbine coupled to a compressor in a turbocharger, and increasing a fueling rate of the engine based on a load step request. The method further includes increasing a speed of rotation of the turbocharger based on the increasing of the fueling rate, and limiting dissipation of heat energy from the flow of exhaust to the turbine to hasten the increase in the speed of rotation of the turbocharger. The method further includes increasing dissipation of heat energy from the flow of exhaust to the turbine after satisfaction of the load step request.

In another aspect, an engine system includes an engine having a plurality of combustion cylinders formed therein, and a turbocharger including a turbine and a compressor. The engine system further includes an intake system having an intake conduit extending between an air inlet and the compressor, and between the compressor and the plurality of combustion cylinders. The engine system further includes an exhaust system having an exhaust conduit extending between the plurality of combustion cylinders and the turbine, and a fuel system. The fuel system includes a first fuel admission valve coupled with the intake conduit at an upstream delivery location, and a second fuel admission valve coupled with the intake conduit at a downstream delivery location. The engine system further includes an insulator forming a heat exchange cavity in heat transference contact with the exhaust conduit between the plurality of combustion cylinders and the turbine, and a pump structured to feed a heat exchange fluid into the heat exchange cavity to displace an insulating fluid, for varying heat dissipation of a flow of exhaust from the engine to the turbine.

In still another aspect, a method of accepting a load step in an engine includes receiving a load step request, and increasing a fueling rate of the engine based on the load step request. The method further includes boosting a pressure of intake air supplied to the engine with a compressor in a turbocharger based on the increasing of the fueling rate. The method further includes operating the engine in a load step acceptance mode at least in part by limiting dissipation of heat energy of a flow of exhaust to a turbine of the turbocharger during the boosting of the pressure of intake air, and transitioning the engine to a steady state mode after satisfaction of the load step request at least in part by increasing dissipation of heat energy from the flow of exhaust to prevent overheating of the turbine.

DETAILED DESCRIPTION

Figure 1:
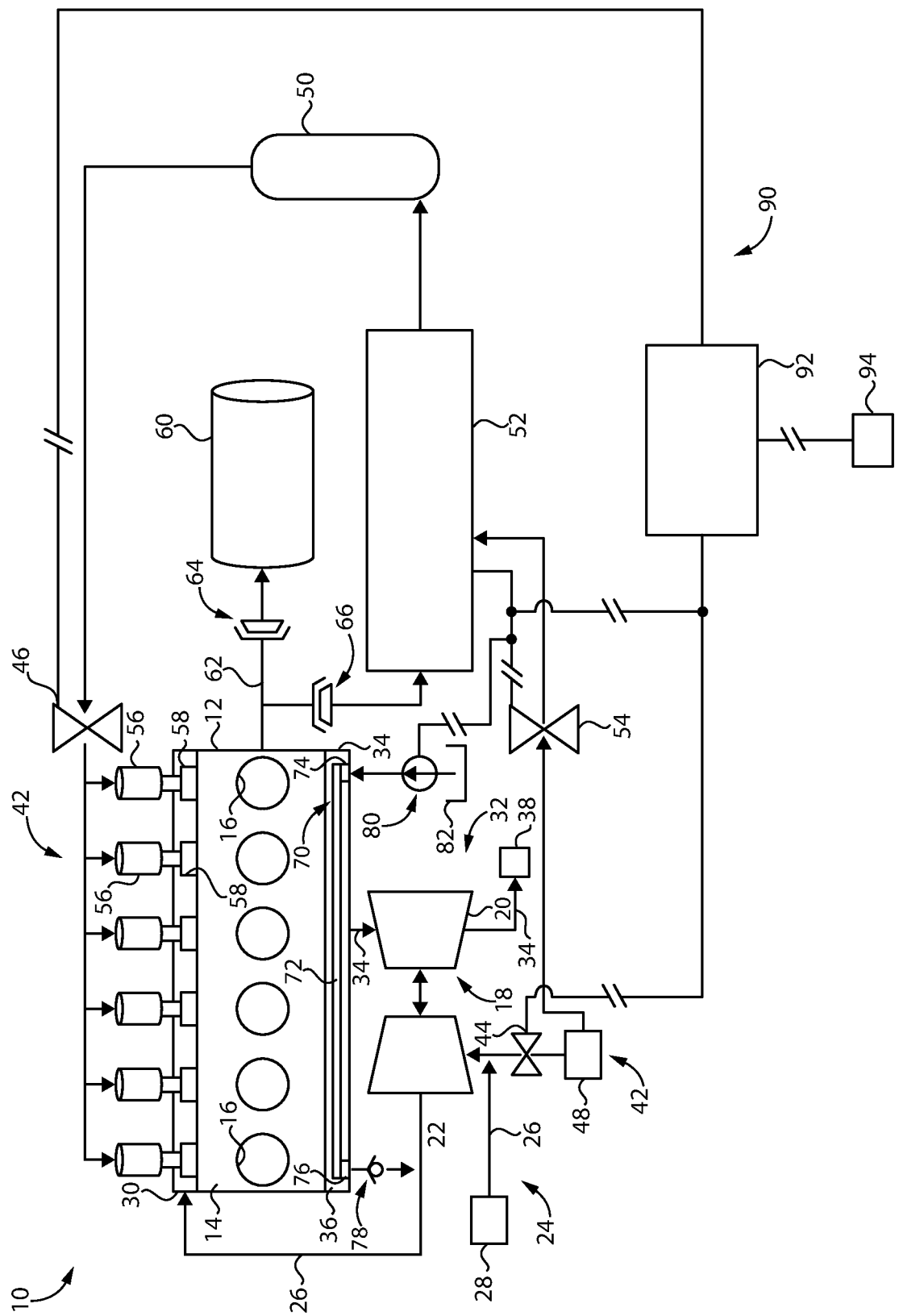
FIG. 1 is schematic view of an engine system according to one embodiment.

Referring to FIG. 1, there is shown an internal combustion engine system 10 according to one embodiment. Engine system 10 includes an engine 12 having an engine housing 14 with a plurality of combustion cylinders 16 formed therein. Engine 12 may have any number of cylinders in any suitable arrangement such as a V-pattern, an inline pattern, or still another. Engine system 10 further includes a turbocharger 18 having a turbine 20 and a compressor 22, an intake system 24, and an exhaust system 32. Intake system 24 includes an intake conduit 26 extending between an air inlet 28 and compressor 22, and between compressor 22 and the plurality of combustion cylinders 16. An intake manifold 30 of intake system 24 distributes air for combustion to each of combustion cylinders 16. Exhaust system 32 includes an exhaust conduit 34 extending between the plurality of combustion cylinders 16 and turbine 20, and between turbine 20 and an exhaust outlet 38. Aftertreatment equipment (not shown) for treating certain emissions in a flow of exhaust from engine 12 may be disposed between turbine 20 and exhaust outlet 38. Exhaust system 32 further includes an exhaust manifold 36 receiving exhaust from combustion cylinders 16.

Engine system 10 also includes a fuel system 42 having a first fuel admission valve 44 coupled with intake conduit 26 at an upstream delivery location, and a second fuel admission valve 46 coupled with intake conduit 26 at a downstream delivery location. Each of valves 44 and 46 can be operated to open and permit fuel to flow and closed to shut off a flow of fuel as further discussed herein. For purposes of the present description intake manifold 30 is understood to be part of intake conduit 26, and exhaust manifold 36 is understood to be part of exhaust conduit 34. Fuel system 42 further includes a fuel supply 48. Fuel supply 48 can include a gaseous fuel supply, for example a supply of natural gas, structured to feed gaseous fuel for combustion into intake conduit 26 by way of first fuel admission valve 44. Those skilled in the art will recognize the arrangement of fuel supply 48 relative to intake conduit 26 as a fumigated fueling arrangement, where compressor 22 will rotate to compress a mixture of a gaseous fuel and air for supplying the same to combustion cylinders 16. Fuel supply 48 may include a low pressure gaseous fuel supply structured to receive a gaseous fuel from, for example, an underground natural gas line, an industrial or agricultural biogas source, a landfill, a mine, or still another. Gaseous fuel within or connected to fuel supply 48 could be stored in a cryogenically liquefied state, and vaporized and pressurized for supplying to engine 12 in some embodiments. Gaseous fuels as contemplated herein include fuels having a gaseous state at standard temperature and pressure but could also include fuels such as premixed gasoline. Gaseous fuels according to the present disclosure could also include ethane, methane, propane, landfill gas, biogas, mine gas, blends of these, or still others.

Fuel system 42 may also include a high pressure gas supply, such as a compressed gas supply 50 for supplying a gaseous fuel to engine 12 by way of second fuel admission valve 46. In an embodiment, compressed gas supply 50 includes a compressed fuel storage tank, hereinafter described as such, and fuel system 42 includes a fuel compressor 52, such as a reciprocating piston compressor, structured to pressurize gaseous fuel for storing in compressed fuel storage tank 50. Fuel system 42 further includes a plurality of gas injectors 56 structured to receive a flow of gas from compressed gas supply 50 by way of second fuel admission valve 46. Each of gas injectors 56 may be structured for port injection of gaseous fuel into intake ports 58 associated with combustion cylinders 16. A plurality of gas injectors 56 may provide injection of gaseous fuel to a plurality of intake ports 58 each associated with one of combustion cylinders 16. In one implementation, each of gas injectors 56 is passively operated, and injects gaseous fuel continuously when second fuel admission valve 46 is open and stops injection when second fuel admission valve 46 is closed. Gas injectors 56 could be directly operated in other embodiments. By alternating between, or combining, the operation of second fuel admission valve 46 and gas injectors 56 for intake port injection and the operation of first fuel admission valve 44 for fumigation operation, in conjunction with controlling dissipation of heat energy of exhaust, engine system 10 can be advantageously operated for improved load acceptance as compared to certain known strategies.

Engine system 10 is coupled with an electrical generator 60 to form a generator set in the illustrated embodiment. A clutch 64 is provided to selectively connect a crankshaft 62 or other driveline component of engine 12 to generator 60. Engine system 10 also includes a power take-off connection from crankshaft 62 or another driveline component that operates fuel compressor 52. A clutch 66 may be, or be a part of, the power take-off connection, and operably positioned between crankshaft 62 and fuel compressor 52 as in the illustrated embodiment. In other instances, fuel compressor 52 could be electronically, hydraulically, or pneumatically operated, or driven with a separate stand-alone engine, for instance.

Engine system 10 further includes an insulator 70 forming a heat exchange cavity 72 in heat transference contact with exhaust conduit 34 between combustion cylinders 16 and turbine 20. "Heat transference contact" means material forming heat exchange cavity 72 is positioned for transfer of heat by conduction from exhaust conduit 34 and exhaust within exhaust conduit 34. Engine system 10 also includes a pump 80 structured to feed a heat exchange fluid from a tank 82 into heat exchange cavity 72. As will be further apparent from the following description, feeding a heat exchange fluid, including water and/or engine coolant, into heat exchange cavity 72 displaces an insulating fluid such as air from heat exchange cavity 72 and replaces the insulating fluid with the heat exchange fluid to vary heat dissipation of a flow of exhaust from engine 12 to turbine 20. In the illustrated embodiment, insulator 70 is integrally resident in and forms a part of exhaust manifold 36. In other embodiments, rather than an exhaust manifold being or including an insulator, the insulator might be located downstream of exhaust manifold 36 but upstream of turbine 20. According to the present disclosure the term "upstream" can be understood to mean in a direction of air inlet 28 and "downstream" can be understood in a direction of exhaust outlet 38.

In the embodiment of FIG. 1, a valve 78 is shown associated with an outlet 72 of heat exchange cavity 72. Pump 80 is shown connected to an inlet 74 to heat exchange cavity 72. Pump 80 could be operated in a first direction to fill heat exchange cavity 72 with a heat exchange fluid from tank 82 and displace the insulating fluid through outlet 76 and past valve 78. Pump 80 could be operated in a second, opposite direction to drain the heat exchange fluid from heat exchange cavity 72 and refill heat exchange cavity 72 with air. Valve 78, if used, could be electronically controlled to open and admit air back into heat exchange cavity 72 as the heat exchange fluid is drained. Any suitable arrangement of pumps, valves, inlets, outlets, could be employed to enable one or more pumps to control and vary the presence or flow of insulating fluids and heat exchange fluids into and out of heat exchange cavity 72.

Engine system 10 further includes a control system 90 including an electronic control unit 92, which may be any suitable central processing unit such as a microprocessor or a microcontroller, in communication with first fuel admission valve 44, second fuel admission valve 46, a third valve 54 positioned fluidly between fuel compressor 52 and fuel supply 48, and potentially still other components including pump 80, fuel compressor 52, and clutches 64 and 66. An input device 94 may be part of control system 90 and coupled with electronic control unit 92. Input device 94 could include an operator input device, a device monitoring an electrical load of generator 60, or still another device that produces a load step request or data indicative of a requested increase in load that can be received by electronic control unit 92 and acted upon to operate engine system 10 as further discussed herein.

INDUSTRIAL APPLICABILITY

Figure 2:
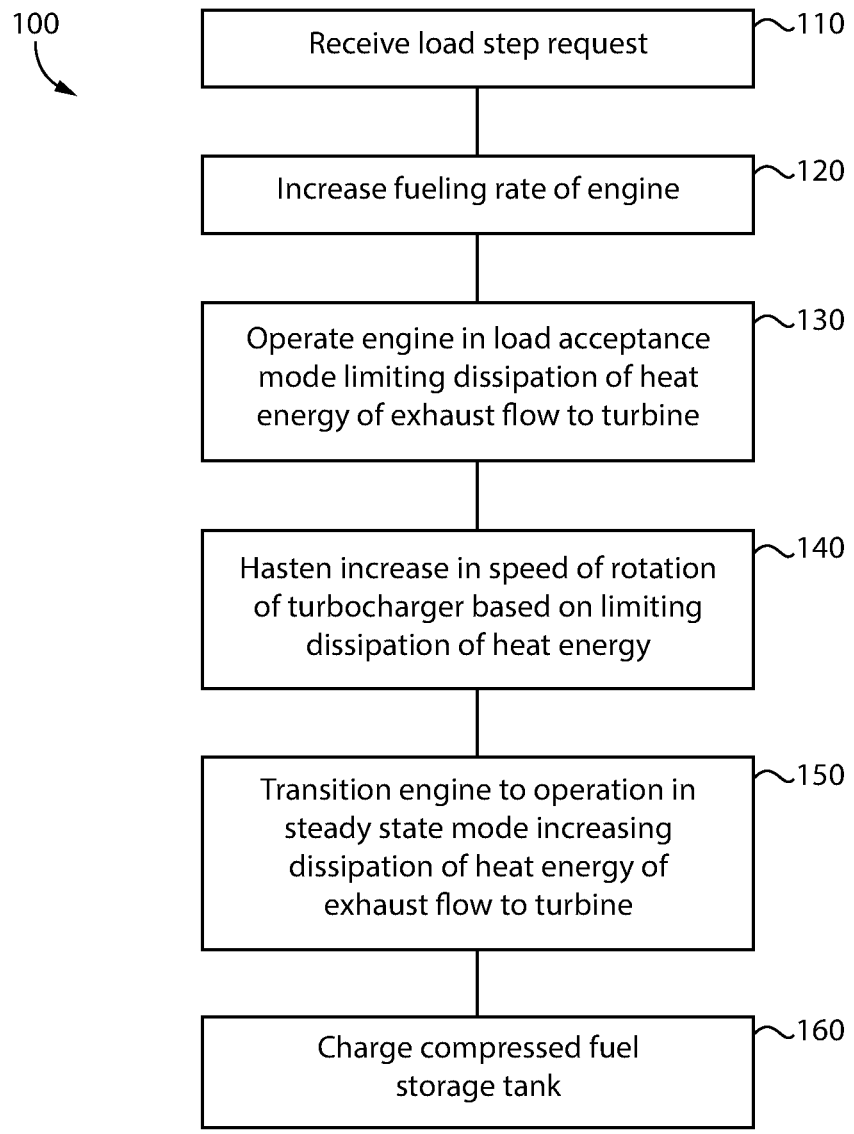
FIG. 2 is a flowchart illustrating example methodology and logic flow, according to one embodiment.

Referring also now to FIG. 2, there is shown a flowchart 100 illustrating example methodology and logic flow, and including a block 110 where a load step request is received. At and before block 110 engine system 10 may be operating at a first load level, with the load step request requesting increasing engine load to a second, higher load level, for instance a request to increase engine load of engine 12 by 5%, 20%, 40% and so on, based upon an increased electrical load demand on generator 60. At and before receiving load step request at block 110 engine system 10 might not be operating at all, however. Accordingly, the methodology and logic flow depicted in flowchart 100, and accompanying description, can be understood to refer analogously to operations that might be performed when engine system 10 is accepting a load step request to transition from zero load where the engine is off to an increased load level during starting, as well as where engine is operating at a first load level and is requested to accept a load step to commence operating at an increased load level.

Operating engine system 10 upon starting or when transitioning to a higher load level can include feeding a flow of exhaust from combustion cylinders 16 to turbine 20. At a block 120 in flowchart 100 a fueling rate of engine 10 is increased based on the load step request received at block 110. In response to the increasing of the fueling rate of engine 12 operation of engine system 10 can proceed by increasing a speed of rotation of turbocharger 18, in response to an increased exhaust momentum resulting from the increased fueling rate. Beginning at or just after block 110, with the fueling rate of engine 12 having been increased and a speed of rotation of turbocharger 18 increasing, engine 12 can be operated in a load acceptance mode as shown at a block 130 in flowchart 100. Operating engine 12 in the load acceptance mode can include limiting dissipation of heat energy of exhaust flow to turbine 20. As discussed herein limiting of dissipation of heat energy of the exhaust flow to turbine 20 can include insulating exhaust conduit 34 feeding the flow of exhaust to turbine 20, with an insulating fluid in heat exchange cavity 72.

The present disclosure reflects the insight that by limiting the dissipation of heat energy of the flow of exhaust to turbine 20 a relatively increased exhaust energy can be made available to rotate compressor 22 than what would be available if dissipation of heat energy were not limited, such as in an engine equipped with a conventional exhaust manifold without an insulator or insulating fluid. As a result, the limiting of dissipation of heat energy hastens an increase in speed of rotation of turbocharger 18, as shown at a block 140 in flowchart 100, such that boosting a pressure of intake air with compressor 22 increases faster than it otherwise might. The present disclosure also reflects the insight and observation that turbine temperature will tend to be increased when dissipation of heat energy is limited, potentially up to a point that turbine 20 can begin to overheat without intervention. When the load step request is satisfied, or at some time after satisfaction of the load step request, engine 12 can be transitioned to operation in a steady state mode increasing dissipation of heat energy of exhaust flow to turbine 20, as shown at a block 150. As discussed above, insulator 70 can be structured to limit dissipation of heat energy of exhaust flow to turbine 20 when an insulating fluid such as air is resident in heat exchange cavity 72. When the insulating fluid is displaced by a heat exchange fluid, such as by operating pump 80 to pump water and/or engine coolant into heat exchange cavity 72, dissipation of heat energy of the flow of exhaust to turbine 20 will increase preventing overheating of turbine 20. From block 150, flowchart 100 can advance to a block 160 to charge compressed fuel storage tank 50 as discussed herein.

It will be recalled that engine system 10 can be operated to supply gaseous fuel for combustion by fumigating gaseous fuel into intake conduit 26 at, for example, a location that is upstream of compressor 22 in turbocharger 18. Engine system 10 can also be operated such that supplying of gaseous fuel includes port injecting gaseous fuel, at locations upstream of combustion cylinder 16 and downstream of compressor 22. When engine 12 is cranking during start-up, or increasing a fueling rate to accept a load step when already operating at a steady state condition, gaseous fuel may be supplied by way of initiating port injection to provide a rapidly responsive increase in fueling over what might be observed were engine system 10 continued to operate by fumigation. In other words, port injection of gaseous fuel, including at a relatively higher pressure, can be used to start engine 12 or to accept a load step when engine 12 is already operating. When a load step request has been satisfied engine system 10 can be returned to steady state operation, and port injection of gaseous fuel stopped in favor of a return to fumigation operation. This general strategy enables engine system 10 to more rapidly spool up turbocharger 18 to provide a desired increased boost to a pressure of intake air during transient load changes. As noted above, once the load step request has been satisfied, engine system 10 can be operated such as by closing clutch 66 and opening valve 54 to charge compressed fuel storage tank 50 with gaseous fuel in anticipation of the next load step request.

Those skilled in the art will be familiar with the limitations of certain engines respecting load acceptance. In certain traditional engine system and generator set configurations employing diesel engines a short term reduction or droop in engine speed is often observed where an increased load level of the engine is requested. Diesel and certain other liquid fueled engine systems tend to be well suited to responding to such increased load level requests as fueling can be increased substantially instantaneously. In the case of lower BMEP (brake mean effective pressure) and less power dense gaseous fuel engines a similar, although more pronounced, droop in engine speed is often observed, however, such gaseous fuel engines can often be operated such that the higher BMEP and speed droop is acceptable if not optimal. In the case of more recently developed, relatively more power dense gaseous fuel engines, in some instances the droop in engine speed can be severe enough that engine shut down is initiated, especially where load step requests are relatively large.

According to the present disclosure engine system 10 can transition between fumigation operation and a more diesel-like gaseous fuel introduction where gas is injected into intake ports as discussed herein, for instance at injection pressure from about 2 bar to about 9 bar. As a result, with fumigation turned off or much reduced compressor 22 is required to do less work to boost a pressure of intake air. At the same time dissipation of heat energy of a flow of exhaust to turbine 20 is limited such that an amount of energy available to compressor 22 for boosting a pressure of intake air is maximized. When the load step request is satisfied engine system 10 is returned to normal fumigation operation, and heat exchange cavity 72 can be filled with heat exchange fluid to avoid overheating turbine 20. In anticipation of, or upon receipt of, another load step request pump 80 can be operated to purge heat exchange cavity 72 of heat exchange fluid and refill heat exchange cavity 72 with an insulating fluid.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:
feeding a flow of exhaust from combustion cylinders in an engine to a turbine coupled to a compressor in a turbocharger;
increasing a fueling rate of the engine based on a load step request;
increasing a speed of rotation of the turbocharger based on the increasing of the fueling rate;
limiting dissipation of heat energy from the flow of exhaust to the turbine to hasten the increase in the speed of rotation of the turbocharger; and
increasing dissipation of heat energy from the flow of exhaust to the turbine after satisfaction of the load step request.

2. The method of claim 1 wherein the limiting of dissipation of heat energy includes insulating an exhaust conduit feeding the flow of exhaust to the turbine.

3. The method of claim 2 wherein the increasing of the dissipation of heat energy includes displacing an insulating material from heat transference contact with the exhaust conduit.

4. The method of claim 3 wherein the displacing of the insulating material includes displacing an insulating fluid from a heat exchange cavity formed in an exhaust manifold of the engine.

5. The method of claim 4 wherein the displacing of the insulating material includes displacing air from the heat exchange cavity with a heat exchange fluid including water and/or engine coolant.

6. The method of claim 1 wherein the feeding of exhaust includes feeding a flow of exhaust produced by combustion of a mixture containing a gaseous fuel and air.

7. The method of claim 6 further comprising supplying gaseous fuel from a first delivery location to the combustion cylinders prior to the receipt of the load step request, and supplying gaseous fuel from a second delivery location to the combustion cylinders after the receipt of the load step request.

8. The method of claim 7 wherein the supplying of gaseous fuel from a first delivery location includes fumigating gaseous fuel into an intake conduit for the engine at a location that is upstream of a compressor in the turbocharger, and the supplying of gaseous fuel from a second delivery location includes port injecting gaseous fuel at locations upstream of the combustion cylinders and downstream of the compressor.

9. The method of claim 6 wherein the feeding of exhaust gases further includes feeding exhaust gases produced by combustion of a gaseous fuel that is delivered by port injection during starting the engine.

10. An engine system comprising:
an engine having a plurality of combustion cylinders formed therein;
a turbocharger including a turbine and a compressor;
an intake system including an intake conduit extending between an air inlet and the compressor, and between the compressor and the plurality of combustion cylinders;
an exhaust system having an exhaust conduit extending between the plurality of combustion cylinders and the turbine;
a fuel system having a first fuel admission valve coupled with the intake conduit at an upstream delivery location, and a second fuel admission valve coupled with the intake conduit at a downstream delivery location;
an insulator forming a heat exchange cavity in heat transference contact with the exhaust conduit between the plurality of combustion cylinders and the turbine; and
a pump structured to feed a heat exchange fluid into the heat exchange cavity to displace an insulating fluid, for varying heat dissipation of a flow of exhaust from the engine to the turbine.

11. The engine system of claim 10 wherein the exhaust system includes an exhaust manifold and the insulator is resident in the exhaust manifold.

12. The engine system of claim 10 wherein the first delivery location is upstream of the compressor.

13. The engine system of claim 12 wherein the fuel system includes a plurality of fuel injectors coupled with the second fuel admission valve and positioned to inject a fuel into a plurality of intake ports in the engine.

14. The engine system of claim 13 wherein the fuel system includes a gaseous fuel system having a low pressure fuel supply fluidly connected to the first fuel admission valve, a compressed fuel storage tank fluidly connected to the second fuel admission valve, and a fuel compressor connected between the low pressure fuel supply and the compressed fuel storage tank.

15. The engine system of claim 14 further comprising a power take-off connection between a crankshaft of the engine and the fuel compressor.

16. A method of accepting a load step in an engine comprising:
receiving a load step request;
increasing a fueling rate of the engine based on the load step request;
boosting a pressure of intake air supplied to the engine with a compressor in a turbocharger based on the increasing of the fueling rate;
operating the engine in a load step acceptance mode at least in part by limiting dissipation of heat energy of a flow of exhaust to a turbine of the turbocharger during the boosting of the pressure of intake air; and
transitioning the engine to a steady state mode after satisfaction of the load step request at least in part by increasing dissipation of heat energy from the flow of exhaust to prevent overheating of the turbine.

17. The method of claim 16 wherein the increasing of the fueling rate of the engine includes initiating port injection of a gaseous fuel to combustion cylinders in the engine.

18. The method of claim 17 wherein the limiting of the dissipation of heat energy from the flow of exhaust to the turbine further includes insulating the flow of exhaust with an insulating fluid.

19. The method of claim 18 wherein:
the insulating of the flow of exhaust with an insulating fluid includes insulating the flow of exhaust with an insulating fluid in a heat exchange cavity in an exhaust manifold of the engine; and
the increasing of the dissipation of heat energy further includes displacing the insulating fluid with a heat exchange fluid.

20. The method of claim 17 further comprising charging a compressed fuel storage tank during the operating of the engine in the steady state mode.

* * * * *